Feb. 22, 1949.  E. H. ELLEBY  2,462,479
RAT OR MOUSE TRAP
Filed June 17, 1946

INVENTOR.
Eugene H. Elleby
BY Victor J. Evans & Co.
ATTORNEYS

Patented Feb. 22, 1949

2,462,479

UNITED STATES PATENT OFFICE 2,462,479

RAT OR MOUSE TRAP

Eugene H. Elleby, Atlanta, Ga.

Application June 17, 1946, Serial No. 677,271

1 Claim. (Cl. 43—81)

This invention relates to improvements in animal traps, particularly adapted and commonly used in the capture of rodents, such as rats and mice.

It is an object of the invention to provide in an animal trap an improved trigger for holding bait, which trigger is instantly released when stepped on by a rodent.

A further object is to provide a trigger which can be formed out of the usual animal trap for capturing rodents.

A further object is to provide a toothed member on a trap, which bites into the rodent when the latter is struck by the spring controlled striker bar of the trap.

These and other objects are attained by the novel construction and arrangement of parts hereinafter described and illustrated by the accompanying drawings, forming a part hereof, and in which.

Figure 1:
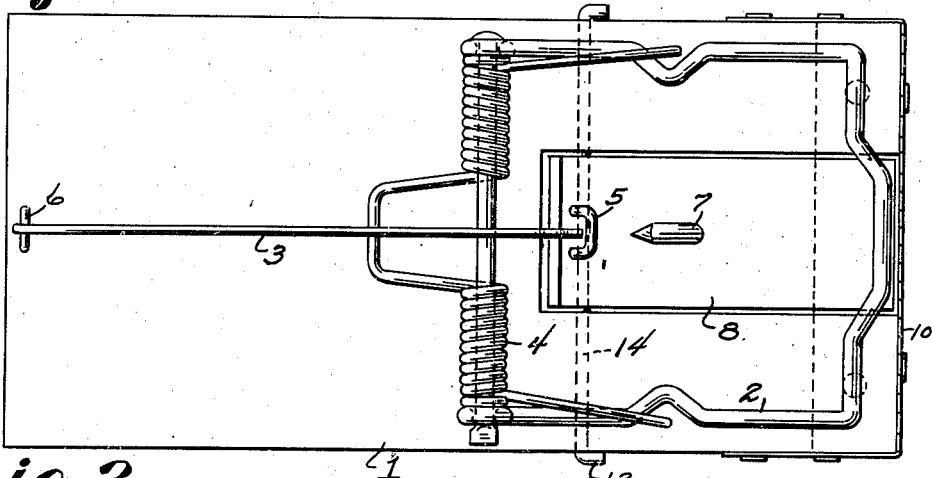
Fig. 1 is a plan view of a trap embodying the invention, with the striker bar released.
Figure 2:
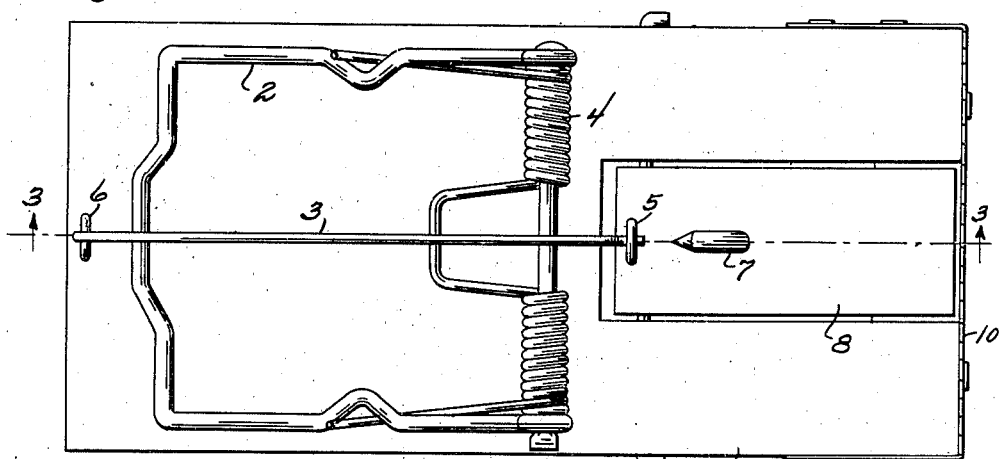
Fig. 2 is a plan view with the striker bar held in position to strike an animal.
Figure 3:
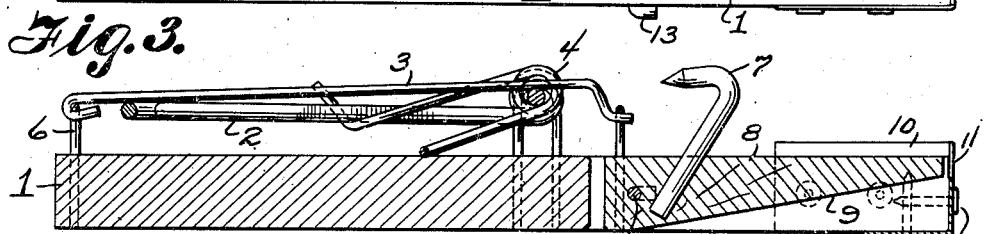
Fig. 3 is a sectional view taken on line 3—3 of Fig. 2.
Figure 4:
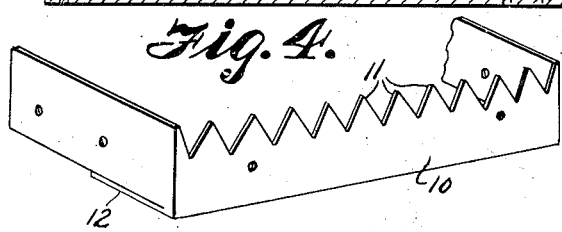
Fig. 4 is a perspective view of a toothed member used on the trap.

Referring to the drawings, the animal trap is shown, the usual wooden block 1, striker bar 2, which is held in position by release rod 3, and under tension of spring 4, the release rod 3 being positioned in staples 5 and 6. A bait holder 7 is provided as usual.

In accordance with the invention, a trigger 8 is formed by sawing out the center of the front of the block 1, about 1½ by 3 inches long. Then the under side is trimmed off at an angle to present an inclined surface as shown at 9.

Tacked on the end of the block 1 by nails 15 is a metal member 10 having saw teeth 11 to catch and grip the rodent when it has been struck by the striker bar 2.

At the bottom of member 10 is a flange 12 which holds the trigger up after it has been released.

From the above description, it will be seen that the improved trigger can be formed readily from an ordinary animal trap by sawing the center of the block. In operation, the trigger goes into action as soon as the animal steps on it, insuring release of the striker bar, before the animal has even touched bait. Accordingly, the same bait can be used over and over again, as the bait is left intact. The usual bait, such as meat or cheese, can be used.

The trigger 8 is pivotally mounted on a rod 13 which passes through a slot 14 in the trigger, and through the block 1.

The above description is to be considered as illustrative and not descriptive of the invention, of which modifications can be made without departing from the spirit and scope of the invention as set forth in the appended claim.

The invention having been described, what is claimed is:

In an animal trap, the combination, which comprises, a rectangular-shaped base having a centrally disposed longitudinally positioned opening extending inwardly from one end, a trigger pivotally mounted in said opening having a sloping under surface extending upwardly from a point below the pivotal mounting thereof, a bait-holding prong positioned on said trigger, an eye mounted on the inner end of the trigger, a centrally disposed retaining rod pivotally mounted on the base at a point spaced from the end opposite to that in which the opening is formed, said rod adapted to be positioned with the free end thereof in the eye of the trigger, a transversely disposed shaft mounted on the base at a point intermediate of the length thereof, a U-shaped bar having arms with recesses in the sides thereof pivotally mounted on the said shaft, a pair of springs mounted on said shaft with the inner ends connected by an extending loop adapted to contact the upper surface of the base and with the outer ends thereof positioned in the recesses of the arms of the U-shaped bar, and a U-shaped toothed bar having a flange on the underside mounted on the end of the base in which the opening is positioned, with the teeth extending upwardly above the upper surface of the base at the end thereof, and with the flange limiting downward movement of the trigger.

EUGENE H. ELLEBY.

REFERENCES CITED

The following references are of record in the file of this patent:

UNITED STATES PATENTS

| Number | Name | Date |
|---|---|---|
| 481,707 | Trumble | Aug. 30, 1892 |
| 1,078,457 | Nolder | Nov. 11, 1913 |
| 1,184,558 | Morton et al. | May 23, 1916 |

FOREIGN PATENTS

| Number | Country | Date |
|---|---|---|
| 508,837 | Germany | Oct. 2, 1930 |